(12) United States Patent
Freed et al.

(10) Patent No.: US 11,580,959 B2
(45) Date of Patent: Feb. 14, 2023

(54) IMPROVING SPEECH RECOGNITION TRANSCRIPTIONS

(71) Applicant: International Business Machines Corporation, Armonk, NY (US)

(72) Inventors: Andrew R. Freed, Cary, NC (US); Marco Noel, Quebec (CA); Aishwarya Hariharan, Morrisville, NC (US); Martha Holloman, Raleigh, NC (US); Mohammad Gorji-Sefidmazgi, Matthews, NC (US); Daniel Zyska, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/034,082

(22) Filed: Sep. 28, 2020

(65) Prior Publication Data

US 2022/0101830 A1 Mar. 31, 2022

(51) Int. Cl.
  *G10L 15/22* (2006.01)
  *G10L 15/10* (2006.01)
  *G10L 15/187* (2013.01)
  *G10L 15/065* (2013.01)

(52) U.S. Cl.
  CPC ............ *G10L 15/10* (2013.01); *G10L 15/065* (2013.01); *G10L 15/187* (2013.01)

(58) Field of Classification Search
  CPC ......... G10L 15/22; G10L 15/26; G10L 15/10; G06F 40/205; G06F 40/30
  See application file for complete search history.

(56) References Cited

U.S. PATENT DOCUMENTS

| 4,741,036 A | 4/1988 | Bahl |
| 6,377,927 B1 | 4/2002 | Loghmani |

(Continued)

FOREIGN PATENT DOCUMENTS

| CN | 101075434 A | 11/2007 |
| CN | 107045871 A | 8/2017 |

(Continued)

OTHER PUBLICATIONS

Freed et al., "Speech Recognition Transcriptions", U.S. Appl. No. 17/034,114, filed Sep. 28, 2020.

(Continued)

*Primary Examiner* — Jakieda R Jackson
(74) *Attorney, Agent, or Firm* — Nicholas A. Welling

(57) ABSTRACT

An approach to correcting transcriptions of speech recognition models may be provided. A list of similar sounding phonemes from associated with the phonemes of high frequency terms may be generated for a particular node associated with a virtual assistant. An utterance may be transcribed and receive a confidence score regarding the correctness of the transcription based on audio metrics and other factors. The phonemes of the utterance can be compared to the phonemes of the high frequency terms from the list and a score for the matching phonemes and similar sounding phonemes can be determined. If it is determined the sounds similar score for a term from the high frequency term list is above a threshold, the transcription can be replaced with the term, providing a corrected transcription.

15 Claims, 8 Drawing Sheets

(56) References Cited

U.S. PATENT DOCUMENTS

| | | | |
|---|---|---|---|
| 6,418,411 B1* | 7/2002 | Gong | G10L 15/20 |
| | | | 704/256.5 |
| 6,785,417 B1 | 8/2004 | Williamson | |
| 7,606,714 B2 | 10/2009 | Williams | |
| 8,494,853 B1* | 7/2013 | Mengibar | G10L 15/065 |
| | | | 704/235 |
| 8,560,317 B2 | 10/2013 | Abe | |
| 9,318,110 B2 | 4/2016 | Roe | |
| 9,626,969 B2 | 4/2017 | Zavaliagkos | |
| 9,858,256 B2 | 1/2018 | Hager | |
| 9,959,864 B1 | 5/2018 | Ingmarsson | |
| 10,083,006 B1* | 9/2018 | Feuz | H04W 4/12 |
| 10,229,356 B1* | 3/2019 | Liu | G06N 3/084 |
| 10,481,863 B2* | 11/2019 | Wei | G06F 3/167 |
| 10,515,637 B1* | 12/2019 | Devries | G10L 13/00 |
| 10,546,583 B2 | 1/2020 | White | |
| 10,672,383 B1* | 6/2020 | Thomson | G06N 20/00 |
| 10,699,695 B1* | 6/2020 | Nadolski | G10L 13/047 |
| 11,062,615 B1* | 7/2021 | Speciner | G09B 5/06 |
| 11,152,000 B1* | 10/2021 | Myers | G10L 15/22 |
| 2004/0034527 A1* | 2/2004 | Hennecke | G10L 15/187 |
| | | | 704/231 |
| 2006/0106605 A1* | 5/2006 | Saunders | G10L 17/04 |
| | | | 704/E17.006 |
| 2007/0271097 A1 | 11/2007 | Abe | |
| 2008/0071542 A1* | 3/2008 | Yu | G10L 15/26 |
| | | | 704/270 |
| 2010/0223056 A1 | 9/2010 | Kadirkamanathan | |
| 2011/0087491 A1* | 4/2011 | Wittenstein | G10L 15/26 |
| | | | 704/235 |
| 2011/0184723 A1 | 7/2011 | Huang | |
| 2011/0307253 A1* | 12/2011 | Lloyd | G10L 15/20 |
| | | | 704/E21.002 |
| 2012/0016671 A1 | 1/2012 | Jaggi | |
| 2012/0158399 A1* | 6/2012 | Tremblay | G10L 15/063 |
| | | | 704/E15.001 |
| 2015/0039299 A1* | 2/2015 | Weinstein | G10L 15/16 |
| | | | 704/202 |
| 2016/0171974 A1 | 6/2016 | Hannun | |
| 2017/0229124 A1 | 8/2017 | Strohman | |
| 2018/0068653 A1 | 3/2018 | Trawick | |
| 2018/0191912 A1* | 7/2018 | Cartwright | G10L 15/02 |
| 2018/0197543 A1 | 7/2018 | Gruenstein | |
| 2018/0293221 A1* | 10/2018 | Finkelstein | G10L 17/10 |
| 2018/0295240 A1* | 10/2018 | Dickins | G10L 21/0316 |
| 2018/0315415 A1 | 11/2018 | Mosley | |
| 2018/0350390 A1 | 12/2018 | Shellef | |
| 2019/0189115 A1* | 6/2019 | Hori | G10L 15/16 |
| 2019/0294973 A1* | 9/2019 | Kannan | G06N 3/088 |
| 2019/0318742 A1* | 10/2019 | Srivastava | G10L 15/07 |
| 2019/0385711 A1 | 12/2019 | Shriberg | |
| 2020/0043475 A1* | 2/2020 | Nguyen | G06K 9/6262 |
| 2020/0051582 A1* | 2/2020 | Gilson | H04N 21/4307 |
| 2020/0175962 A1* | 6/2020 | Thomson | G10L 15/197 |
| 2021/0042657 A1 | 2/2021 | Tiruveedhula | |
| 2021/0065679 A1 | 3/2021 | Finlay | |
| 2021/0158803 A1* | 5/2021 | Knudson | G10L 15/22 |
| 2021/0227338 A1* | 7/2021 | Abdallah Abdelrehim Abokela | H04R 25/507 |
| 2022/0059077 A1 | 2/2022 | Thomson | |

FOREIGN PATENT DOCUMENTS

| | | |
|---|---|---|
| CN | 107077842 A | 8/2017 |
| EP | 0191354 A1 | 8/1986 |
| WO | 2022062595 A1 | 3/2022 |

OTHER PUBLICATIONS

List of IBM Patents or Patent Applications Treated as Related. Filed Sep. 28, 2020. 2 pages.

International Search Report and Written Opinion, International Application No. PCT/CN2021/106646, International Filing Date Jul. 15, 2021.

Combined Search and Examination Report and Written Opinion, Application No. GB2113211.3, Report dated May 10, 2022, 10 pages.

Response to Foreign Search and Examination report dated May 10, 2022, Filed May 16, 2022 in Foreign Application No. GB2113211.3, 2 pages.

"Method to build cluster dependent acoustic models for speech recognition", An IP.com Prior Art Database Technical Disclosure, Authors et al.: Disclosed Anonymously, IP.com No. IPCOM000210959D, Sep. 19, 2011, 6 pages.

"Metrics features", IBM, last updated Jun. 23, 2020, 9 pages, <https://cloud.ibm.com/docs/speech-to-text?topic=speech-to-text-metrics#audio_metrics>.

"Using Grapheme-to-phoneme and speech synthesis to generate audio captcha", An IP.com Prior Art Database Technical Disclosure, Authors et al.: Disclosed Anonymously, IP.com No. IPCOM000230648D, Aug. 29, 2013, 3 pages.

Daga et al., "Domain-Specific Language Model Using Domain Literature and Experts' Spoken Language", An IP.com Prior Art Database Technical Disclosure, IP.com No. IPCOM000251170D, IP.com Electronic Publication Date: Oct. 20, 2017, 11 pages.

Deng, Li, "Deep Speech Recognition—New-Generation Models & Methodology for Advancing Speech Technology and Information Processing", Microsoft Research, Jul. 6, 2013, 181 pages, Redmond, USA.

Mell et al., "The NIST Definition of Cloud Computing", Recommendations of the National Institute of Standards and Technology, NIST Special Publication 800-145, Sep. 2011, 7 pages.

Wiggers, Pascal, "Modelling Context in Automatic Speech Recognition", Proefschrift, Jun. 4, 2008, 203 pages.

Young et al., "Recent Trends in Deep Learning Based Natural Language Processing", arXiv:1708.02709v8 [cs.CL], Nov. 25, 2018, 32 pages.

* cited by examiner

US 11,580,959 B2

IMPROVING SPEECH RECOGNITION TRANSCRIPTIONS

BACKGROUND OF THE INVENTION

The present invention relates generally to the field of speech recognition, and more specifically to improving the transcription of utterances in speech recognition.

Speech recognition models have long attempted to allow users to interact with computing devices through utterances or spoken commands. The ability of voice assistants to process spoken commands and utterances has experienced a tremendous amount of growth in the past decade with the improvements in the processing capabilities and memory capacity. These improvements have permitted the development of a new user interface, where spoken commands and utterances can provide the computing device with instructions. In some models, speech recognition involves receiving sound waves and identifying phonemes from the soundwaves and assigning a computer understandable meaning to the phonemes.

SUMMARY

Embodiments of the present disclosure include a computer-implemented method, computer program product, and a system for training a model for improving the speech recognition of a speech assistant. Training the model to improve speech recognition may involve receiving a history of utterances and corresponding audio metrics for the utterances and generating a sounds similar list for at least one utterance based on the history of utterances and the audio metrics for the utterances.

The above summary is not intended to describe each illustrated embodiment of every implementation of the present disclosure.

Figure 1:
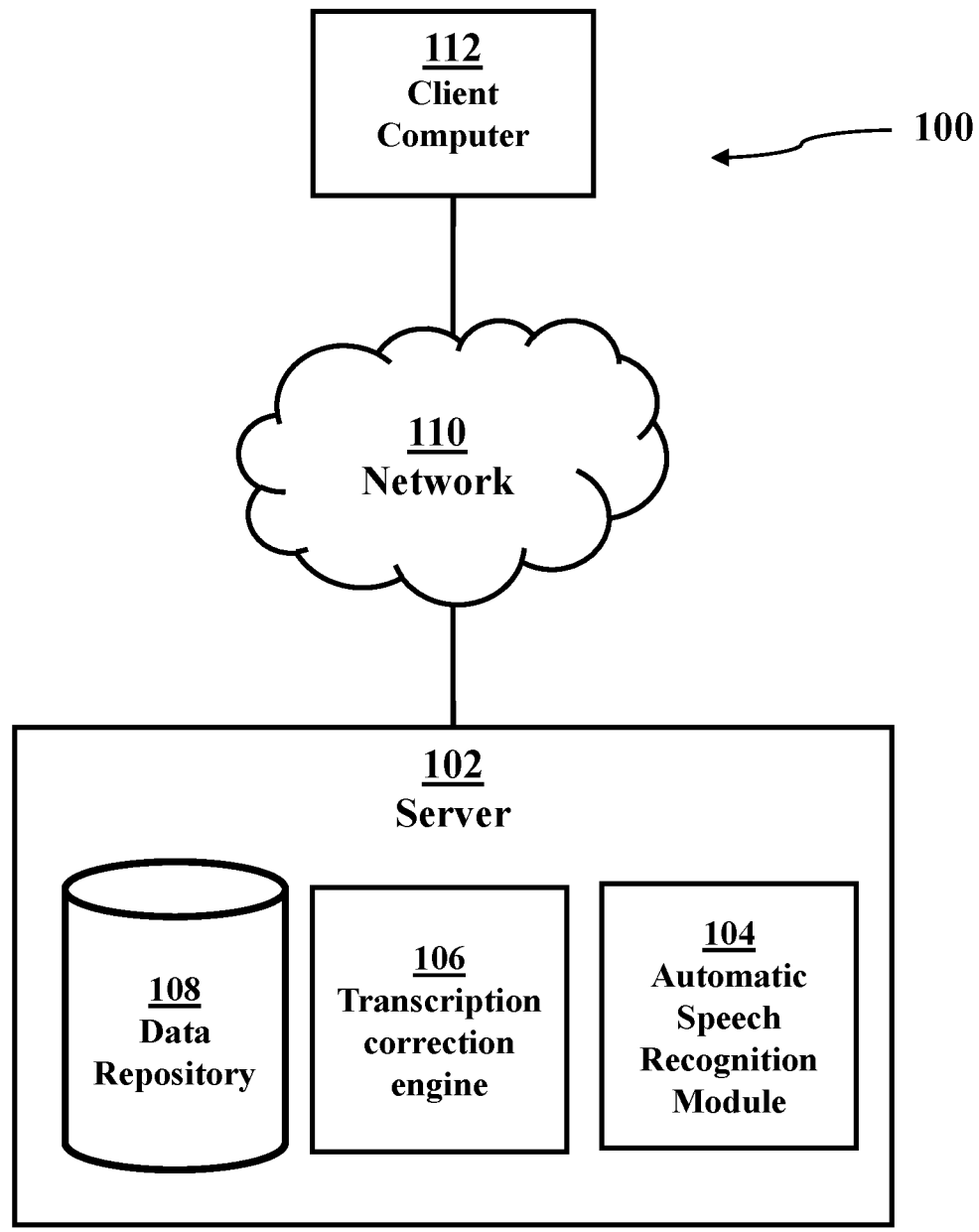
FIG. 1 is a functional block diagram generally depicting a speech recognition transcription correction environment, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted allow for an approach to correct speech recognition transcriptions, more specifically comparing the phonemes of a low confidence transcription to phonemes of expected high frequency terms and correcting the low confidence transcription based on the comparison.

In an embodiment of the invention, a log of historical recordings of user utterances and audio metrics at a specific node of a virtual assistant (VA) are received. A VA can be a question/answer program (e.g. Watson® by International Business Machines, Inc., Ski® by Apple, Inc., Alexa® by Amazon, LLC, etc. . . . ) or a VA can be a computer program associated with a user being provided with prompts and responding to prompts with utterances or commands, like one would experience in calling a customer service number. Additionally, a node can be the isolated prompt or question provided by the VA, where the VA expects certain responses. The recordings are identified based on the term uttered by a user determined by the VA. The highest frequency utterances are also identified. The highest frequency utterances are extracted into their respective phonemes. An extracted phoneme(s) can be isolated, and a list of similar sounding phonemes can be generated for the phoneme. A similarity confidence score can be generated for how similar the phoneme in the list soundings the extracted phoneme. The similar sounding list can be stored in a data repository corresponding to the respective VA node.

In another embodiment of the invention, an utterance recording can be received at a node based on a prompt from a VA. The utterance can be transcribed by an Automatic Speech Recognition (ASR) module and a confidence score for the transcription can be assigned based on the expected response to the prompt of the VA node and/or the audio metrics of the recording. If the confidence score is below a threshold, the transcription is considered a "miss". Good potential transcriptions from a "Sounds Similar" list of high frequency term responses for the node can be loaded from a data repository. The miss transcription can be matched to good transcriptions, based on the expected high frequency terms where the phonemes from the "miss" are compared to phonemes from the potential good transcriptions. The matched transcriptions are scored based on properly aligned phonemes. The "miss" transcription can be replaced by the highest scoring potential good transcription, if the matched score is above a threshold.

FIG. 1 is a functional block diagram depicting, generally, a speech recognition transcription correction environment 100. Speech recognition transcription correction environment 100 comprises automatic speech recognition (ASR) module 104 and transcription correction engine 106 operational on server 102, data repository 108 stored on server 102, client computer 112 and network 110 supporting communications between the server 102 and client computer 112. It should be noted, while only server 102 this is for simplicity, as multiple servers and other computing devices can be included within the environment (i.e. 1, 2, n . . . n+1) accessible via network 110.

Server 102 and client computer 112 can be a standalone computing device, a management server, a web server, a mobile computing device, or any other electronic device or computing system capable of receiving, sending, and processing data. In other embodiments, server 102 and client computer 112 can represent a server computing system utilizing multiple computers as a server system. In another embodiment, server 102 and client computer 112 can be a laptop computer, a tablet computer, a netbook computer, a personal computer, a desktop computer, or any programmable electronic device capable of communicating with other computing devices (not shown) within speech recognition transcription correction environment 100 via network 110.

In another embodiment, server 102 and client computer 112 represent a computing system utilizing clustered computers and components (e.g., database server computers, application server computers, etc.) that can act as a single pool of seamless resources when accessed within speech recognition transcription correction environment 100. Server 102 and client computer 112 can include internal and external hardware components, as depicted and described in further detail with respect to FIG. 6.

Automatic speech recognition (ASR) module 104 can be a computer module capable of receiving an utterance or command and translating it into a computer readable format (described further below). It should be noted, while in FIG. 1 ASR module 104 is shown operational on server 102, it may be operational on any computing device communicating with transcription correction engine 106, via network 110, or on a local computing device with transcription correction engine 106.

Transcription correction engine 106 can be a module for receiving historical data logs. Historical data logs can include the recordings of user utterances. For example, the recordings of user utterances associated with one or more nodes within a virtual assistant system. Historical data logs can also include the audio metrics corresponding to the recorded user utterances. Audio metrics can include information regarding the quality of the recording, including signal-to-noise ratio, background noise, speech ratio, high frequency loss, direct current offset, clipping rate, speech level, and non-speech level. Audio metrics can be provided by software, including but not limited to International Business Machines, Inc., Watson® Speech-to-Text service, which extracts audio metric features. Additionally, transcription correction engine 106 can be capable of identifying the highest frequency terms from the historical data logs within a given timeframe (e.g. one month, two weeks or user defined). Further, transcription correction engine 106 can isolate the user utterances of the most frequent terms into the phonemes of the terms. A list of phonemes that sound similar to the isolated phonemes can be generated by transcription correction engine 106 (explained further below).

Further, transcription correction engine 106 can receive a user utterance and audio metrics for the utterance via a recording or in real-time for a given VA node and translate the utterance into transcription. A transcription confidence score can be generated for the transcription based on the expected response to the utterance and the audio metrics. Further, transcription correction engine 106 can correct the transcription based on the sounds similar list (explained further below). It should be noted, FIG. 1 shows transcription correction engine 106 operational on only one computing device, in some embodiments transcription correction engine 106 may be operational on one or more computing devices or within a cloud computing system. Transcription correction engine 106 may perform some actions described above on the same computing device or different computing devices.

Data repository 108 can be a database capable of storing data including, but not limited to generated "sounds similar lists", phoneme confidence scores, transcription confidence scores, utterances, and corresponding audio metrics for a given VA node. It should be noted, FIG. 1 shows data repository 108 located on server 102, in some embodiments data repository 108 may be located on one or more computing devices or within a cloud computing system.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server 102 and client computer 112.

Figure 2:
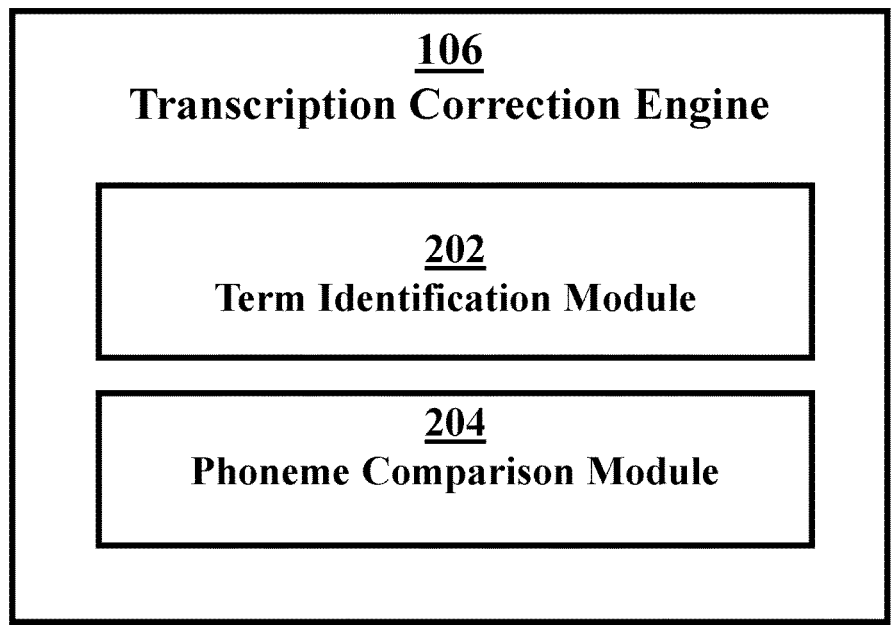
FIG. 2 is a functional block diagram depicting a transcription correction engine, in accordance with an embodiment of the present invention.

FIG. 2 is functional block diagram 200 of a transcription correction engine 106. Term identification module 202 and phoneme comparison module 204 are shown operational within transcription correction engine 106.

Term identification module 202 is a computer module capable of receiving or retrieving utterances broken down into their phonemes and audio metrics from data repository 108. Additionally, term identification module 202 can also receive real time user utterances broken down into phonemes and audio metrics from ASR module 104. In some embodiments, term identification module 202 can identify the high frequency utterances from historical audio logs and the corresponding terms for a specific node of a VA. Further, term identification module 202 can determine the percentage in which a term was used over a time period at a given node. The time period can be static, or dynamic based on configuration. For example, if over a given month a customer service VA for a financial institution provides users with four prompts to choose from: 1) checking, 2) savings, 3) retirement, or 4) loans. Term identification module 202 can determine which of the historical recorded utterances correspond to each term and generate the percentage which each term is selected by a user (e.g. checking 55%, savings 25%, retirement 10% and loans 10%). Additionally, term identification module 202 can identify utterances that to not match up exactly due to poor audio metrics, accents, or mispronunciations (e.g. a user states "refirement" rather than "retirement" or "sabings" rather than "savings"). Term identification module 202 can identify the high frequency terms and utterances corresponding to the terms and send the terms to phoneme comparison module 204.

Phoneme comparison module 204 can be a computer module with the capability to analyze phonemes extracted from historical utterances and real-time user utterances. In an embodiment, phoneme comparison module can receive or retrieve the high frequency terms and phonemes for utterances for a VA node from term identification module 202. Further, phoneme comparison module 204 can generate a sounds similar list for the phonemes of the utterances based on the terms of the VA node. For example, in English there are 44 phonemes. Phoneme comparison module 204 can determine the phonemes of a term and find phonemes that are similar to that term to create a "Sounds Similar" list of phonemes. In some embodiments, a similarity score may be assigned to each phoneme on the list. The similarity score can be based on a human annotated phoneme list or an analysis of the similarity of an audio spectrogram between the two phonemes. In some embodiments, the similarity score can include a regional dialect feature based on identifying the accent of the user making the utterance.

In some embodiments, phoneme comparison module 204 may receive a real time transcription of a user utterance and the extracted phonemes of the utterance with a transcription confidence score below a threshold from ASR module 104. Phoneme comparison module 204 can analyze the phonemes from the utterance to generate a potential "good" transcription for the real-time user utterance. In some embodiments, the number of phonemes will be checked against the number of expected phonemes for an expected term for the VA node. Terms with more or less phonemes will be rejected. For example at if a user intends to say "au-thor-i-za-tion", and ASR module 104 transcribes it "of-her-i-say-shun", the phoneme comparison module 204 would recognize there are five phonemes in the utterance and remove from consideration the high frequency terms that from the list that have four or less phonemes and 6 or more phonemes. Further, the remaining terms can be analyzed to determine which phonemes match. The phonemes that do not match will be compared to the phonemes from the "sounds similar" list for the expected term. For the example above, "i-say-shun" would be a match from the sounds similar list. The remaining two phonemes "of" and "her" would be compared to the phonemes that sounds similar from the sound similar list for authorization. In this example, "of" is in the sounds similar list for the phoneme and "au". However, "her" is not within the sounds similar list for the phoneme corresponding to "thor". Any terms that match will receive a phoneme alignment score and if the phoneme alignment score is above a threshold (predetermined or dynamic based on audio metrics), the newly aligned phonemes can replace the original transcription. A phoneme alignment score can be calculated by determining the percentage of correctly aligned phonemes of the original transcription and factoring the percentage by the sounds similar score to the misaligned phoneme(s). The new transcription can be used to update ASR module 104.

Figure 3:
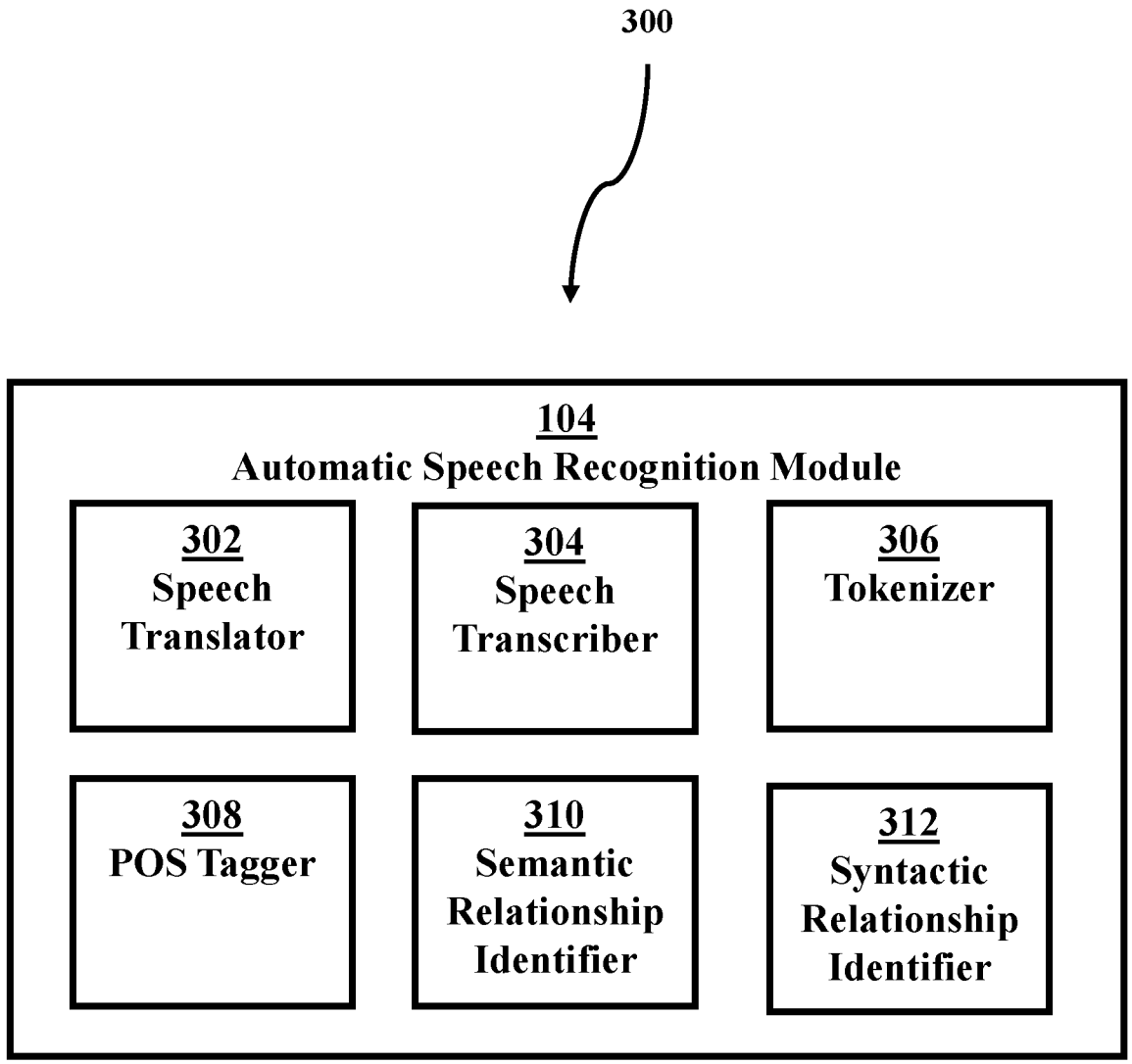
FIG. 3 is a functional block diagram depicting an automatic speech recognition module, in accordance with an embodiment of the present invention.

FIG. 3 is a functional block diagram 300 of ASR module 104 in accordance with an embodiment of the invention. ASR module 104 can be comprised of a speech translator 302, speech transcriber 304, tokenizer 306, part-of-speech (POS) tagger 308, semantic relationship identifier 310, and syntactic relationship identifier 312. In some embodiments, ASR module 104 may be a neural network or hidden markov model or a hybrid neural network/hidden markov model capable of receiving utterances and extracting the phonemes from the utterances and transcribing text from the extracted phonemes.

Speech translator 302 can receive or retrieve utterances from a user. The utterances can be recorded or received in real time as an acoustic wave model. Speech translator 302 can turn the wave model into an audio spectrogram for further analysis. The audio spectrogram can provide a visual representation of an utterance's duration, amplitude, and frequency in a two-dimensional representation. Speech translator 302 can determine phonemes based on an analysis of the audio spectrogram. Additionally, the spectrogram can be broken down into smaller time frames (e.g. 10 milliseconds) to enhance determination of the phonemes from the utterance.

Speech transcriber 304 is a computer module capable of generating text based on an analysis of phonemes received or retrieved from speech translator 302. Some embodiments of the invention may possess capabilities to determine a word based on a prediction model where the previous phoneme or phonemes are considered in the prediction.

Further, speech transcriber may accept input from tokenizer 306, POS tagger 308, semantic relationship identifier 310, and syntactic relationship identifier 312 in the development of transcribing text. Speech transcriber can also provide the capability to assign a transcription confidence score to the transcription based on the audio metrics corresponding to the utterance. In some embodiments, the transcription confidence score can be an evaluation of the signal-to-noise ratio, background noise, speech ratio, high frequency loss, direct current offset, clipping rate, speech level, and non-speech level. In some other embodiments, the confidence score can be context driven, where the score is based on the expected response for a specific VA node. Further, the expected response can be how closely the transcription matches to the expected responses.

In some embodiments, the tokenizer 306 may be a computer module that performs lexical analysis. The tokenizer 306 may convert a sequence of characters into a sequence of tokens. A token may be a string of characters included in a recording and categorized as a meaningful symbol. Further, in some embodiments, the tokenizer 306 may identify word boundaries in a recording and break any text within the corpus into their component text elements, such as words, multiword tokens, numbers, and punctuation marks. In some embodiments, the tokenizer 306 may receive a string of characters, identify the lexemes in the string, and categorize them into tokens.

Consistent with various embodiments, the POS tagger 308 may be a computer module that assigns a word in a transcription to correspond to a particular part of speech. The POS tagger 308 may analyze the transcription of the utterance and assign a part of speech to each word or other token. The POS tagger 308 may determine the part of speech to which a word corresponds based on the definition of the word and the context of the word. The context of a word may be based on its relationship with adjacent and related words in a phrase, sentence, or paragraph. In some embodiments, the context of a word may be dependent on one or more previously analyzed words in the corpus. Examples of parts of speech that may be assigned to words include, but are not limited to, nouns, verbs, adjectives, adverbs, and the like. Examples of other part of speech categories that POS tagger 308 may assign include, but are not limited to, comparative or superlative adverbs, wh- adverbs, conjunctions, determiners, negative particles, possessive markers, prepositions, wh-pronouns, and the like. In some embodiments, the POS tagger 308 may tag or otherwise annotate tokens of "an" words in a corpus with part of speech categories. In some embodiments, the POS tagger 308 may tag tokens or words of a corpus to be parsed by speech transcriber 304.

In some embodiments, the semantic relationship identifier 310 may be a computer module that may be configured to identify semantic relationships of recognized subjects (e.g., words, phrases, images, etc.) in a corpus. In some embodiments, the semantic relationship identifier 310 may determine functional dependencies between entities and other semantic relationships within the transcription.

Consistent with various embodiments, the syntactic relationship identifier 312 may be a computer module that may be configured to identify syntactic relationships in a corpus composed of tokens. The syntactic relationship identifier 312 may determine the grammatical structure of sentences such as, for example, which groups of words are associated as phrases and which word is the subject or object of a verb. The syntactic relationship identifier 312 may conform to formal grammar.

Figure 4:
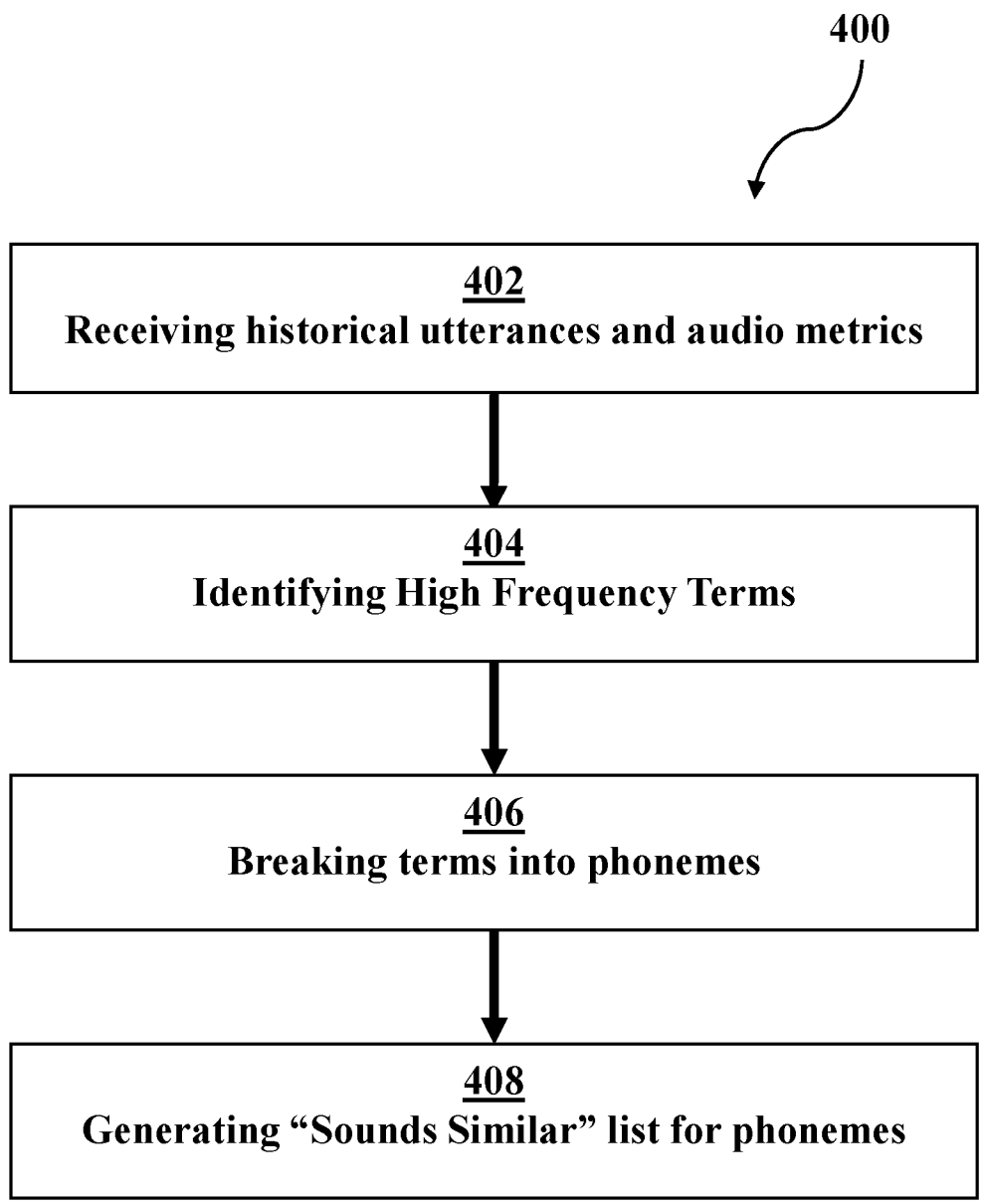
FIG. 4 is a flowchart depicting a method for generating a sounds similar list in accordance with an embodiment of the present invention.

FIG. 4 is a flowchart depicting a method 400 for generating a "sounds similar" list. At 402, historical utterances and the corresponding audio metrics are received at transcription correction engine 106.

At 404, transcription correction engine 106 identifies the high frequency terms from the historical utterances and audio metrics. The high frequency terms can be identified by term identification module 202 through an analysis of the number of times the term was chosen at a VA node in a timeframe. Further, in some embodiments, the audio metrics can be evaluated term identification to determine if the term was chosen and if audio metrics are poor for a given utterance, the utterance can be discounted from the final analysis.

At 406, ASR module 104 can break the identified high frequency terms into the corresponding phonemes. In some embodiments, ASR module 104 will evaluate the acoustic wave model of an utterance that was previously recorded and speech translator 302 will convert the acoustic wave model into an audio spectrogram and isolate phonemes from the audio spectrogram. Speech transcriber 304 can convert the isolated phonemes into text with input from tokenizer 306, POS tagger 308, semantic relationship identifier 310, and syntactic relationship identifier 312 ensuring the transcribed text is semantically and syntactically correct.

At 408 Phoneme comparison module 204 generates a "Sounds Similar" list for the phonemes of the high frequency terms transcribed by ASR module 104. Further, phoneme comparison module 204 can assign a confidence score to the list of similar sounding phonemes for each phoneme from the high frequency terms.

Figure 5:
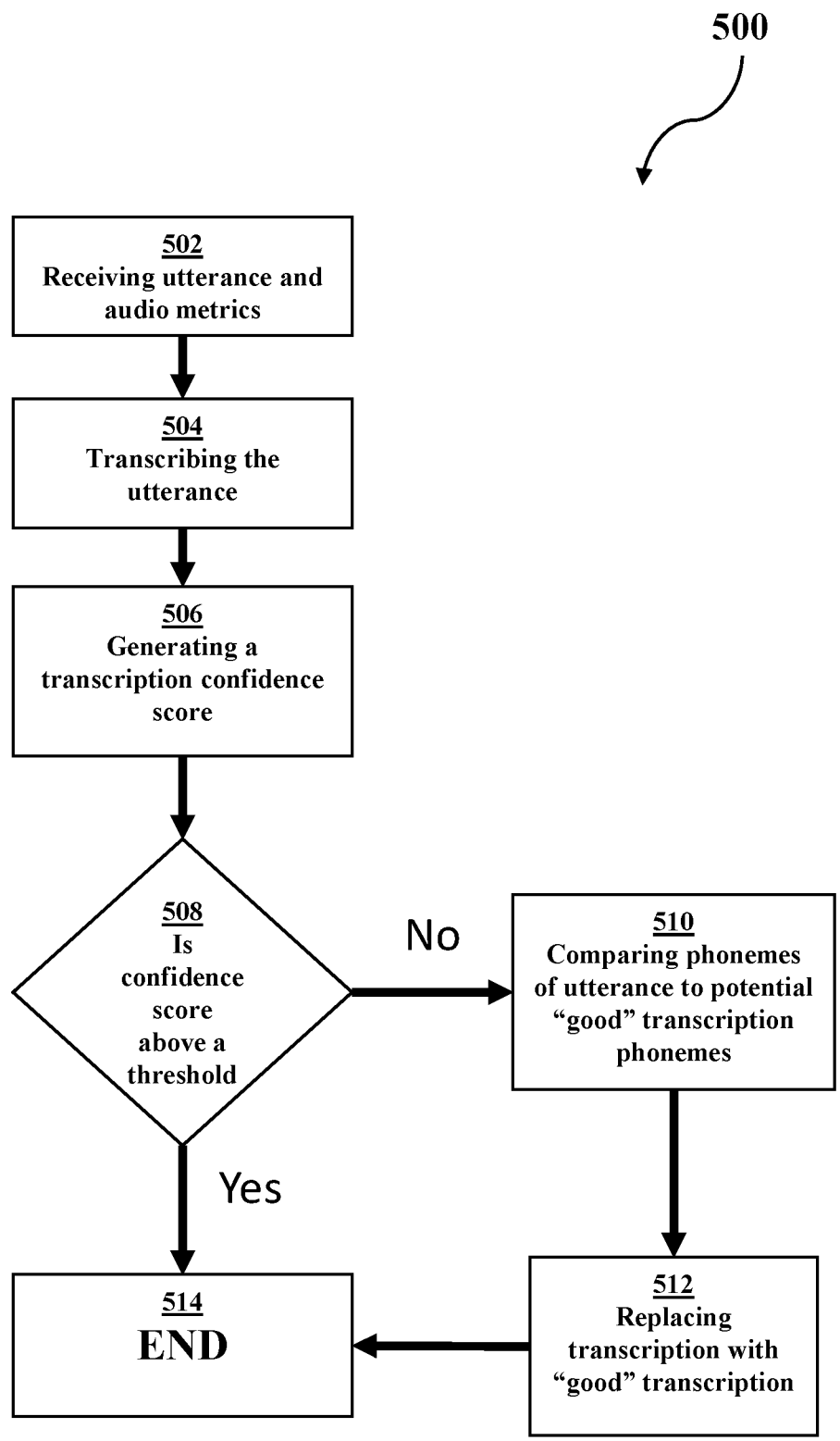
FIG. 5 is a flowchart depicting a method for correcting a speech recognition transcription, in accordance with an embodiment of the present invention.

FIG. 5 is a flowchart depicting a method 500 for correcting a transcription using a sounds similar list. At 502, an utterance and audio metrics can be received by ASR module 104. The utterance can be for a specific VA node or within an open dialog framework for a VA. In some embodiments, the utterance can be within a specific context from an automated customer calling support line. In yet another embodiment, the utterance can be from an open dialog framework where the VA is triggered into operation by a specific utterance and given a preexisting command or asked a question within a specific domain.

At 504, ASR module 104 can transcribe the received utterance. In some embodiments, ASR module 104 can breakdown the utterance into its phonemes and generate the text based off the phonemes. In some embodiments, the text can be generated using a predictive model where the model is a deep neural network.

At 506, ASR module 104 can assign a transcription confidence score to the transcription of the utterance. In some embodiments, the transcription confidence score can be based on an evaluation of the audio metrics or contextual based on the expected response, or a combination of the two.

At 508, transcription correction engine 106 determines if the transcription confidence score is above a threshold. The threshold can be static or dynamic. If the threshold is static, it can be configured by a user based on the user's judgment or needs at the time. The threshold can be dynamically configured based on numerous factors, including, computing resources available at the time, length of the utterances, the VA node utilization at the time of receiving the utterance, etc. If the transcription confidence score is below a threshold, it is the transcription is considered a "miss" and sent on for further processing. If the confidence score is above a threshold, the transcription method ends.

At 510, phoneme comparison module 204 compares the phonemes in the "miss" transcription to phonemes of high frequency terms for a given node. In some embodiments, phoneme comparison module can be configured to analyze the number of phonemes in the transcription and determine which high frequency terms from a contain the same number of phonemes. Further, phoneme comparison module 204 can determine if any phonemes in the transcription match the phonemes in the high frequency terms. For any phonemes from the high frequency terms that do not match the phonemes in the transcription can be compared to phonemes from a "Sounds Similar" list to determine if the phonemes can be matched. Additionally, if the phoneme comparison module 204 can score the number of matched phonemes and matched "sounds similar" phonemes. This score can be a percentage of matched phonemes and a factor of matched "sounds similar" phonemes.

At 512, the "miss" transcription is replaced with the transcription corresponding to the matched phonemes if the matched phonemes score is above a threshold (static or dynamically assigned). The newly developed transcription can be used to update ASR module 104.

At 514, the method ends.

Figure 6:
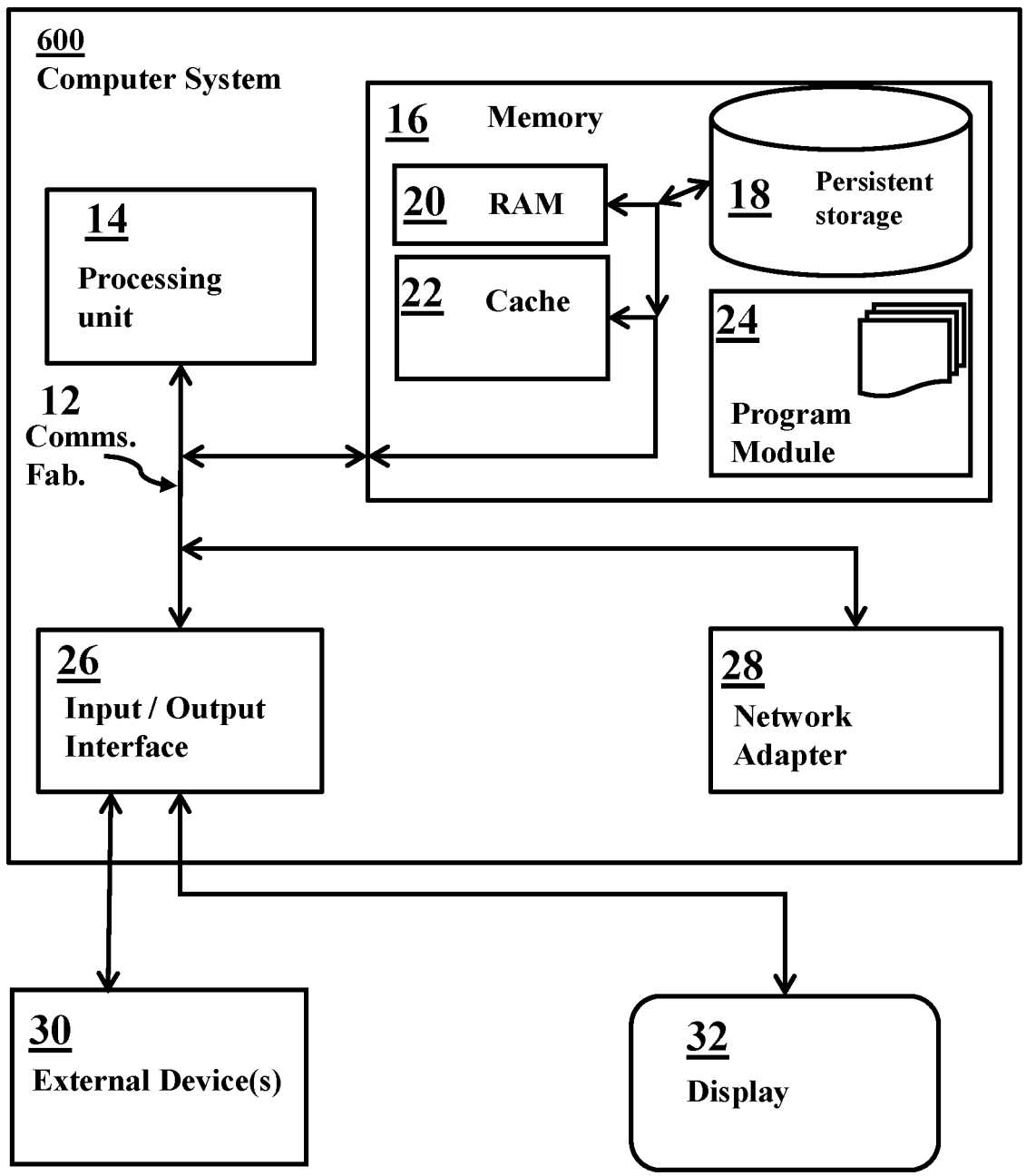
FIG. 6 is a functional block diagram of an exemplary computing system within a speech recognition transcription correction environment, in accordance with an embodiment of the present invention.

FIG. 6 depicts computer system 600, an example computer system representative of server 102 and data repository 108 or any other computing device within an embodiment of the invention. Computer system 600 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 600 includes processors 14, cache 22, memory 16, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes persistent storage 18, random access memory (RAM) 20, cache 22 and program module 24. In general, memory 16 can include any suitable volatile or non-volatile computer readable storage media. Cache 22 is a fast memory that enhances the performance of processors 14 by holding recently accessed data, and data near recently accessed data, from memory 16. As will be further depicted and described below, memory 16 may include at least one of program module 24 that is configured to carry out the functions of embodiments of the invention.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
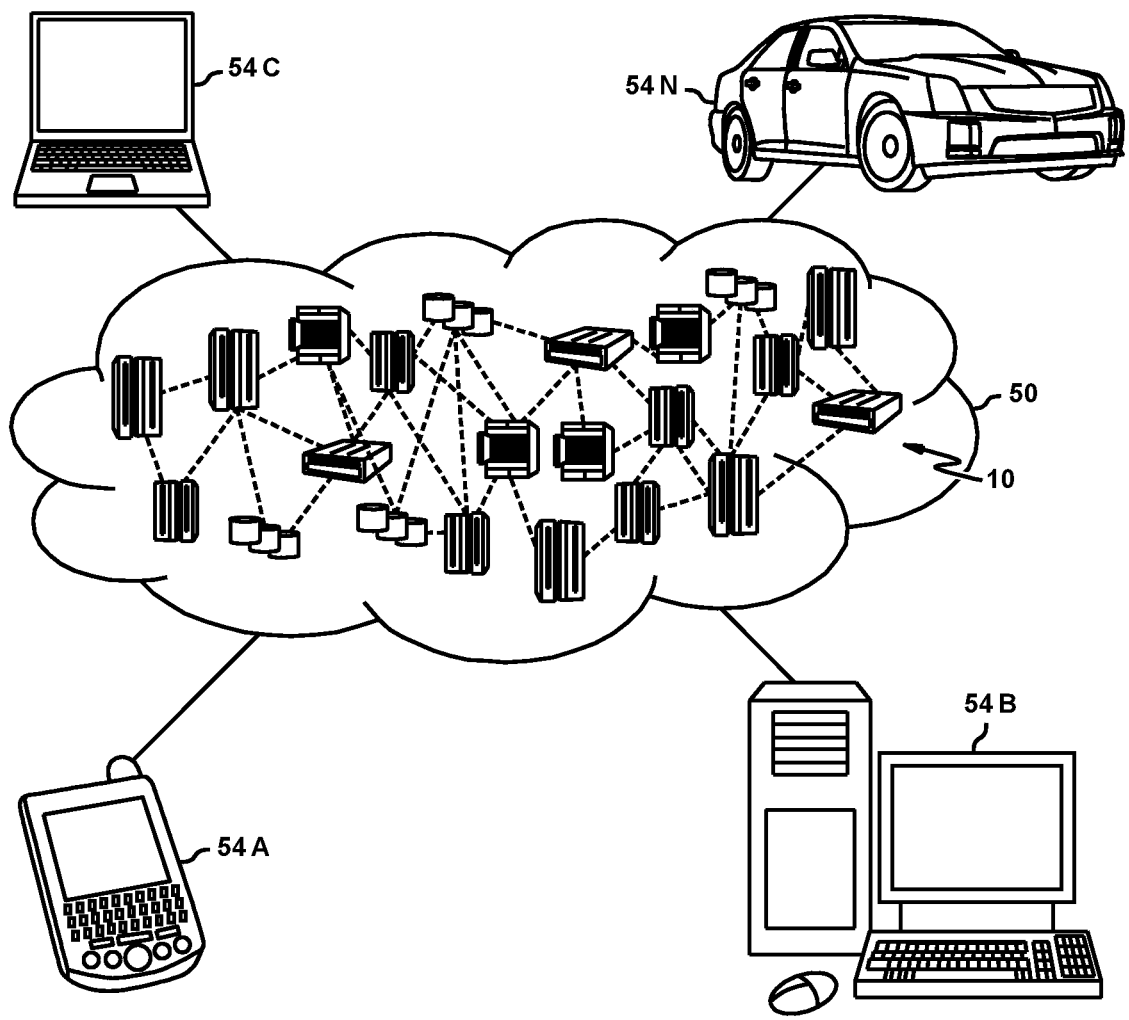
FIG. 7 is a diagram depicting a cloud computing environment, in accordance with an embodiment of the present invention.

FIG. 7 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
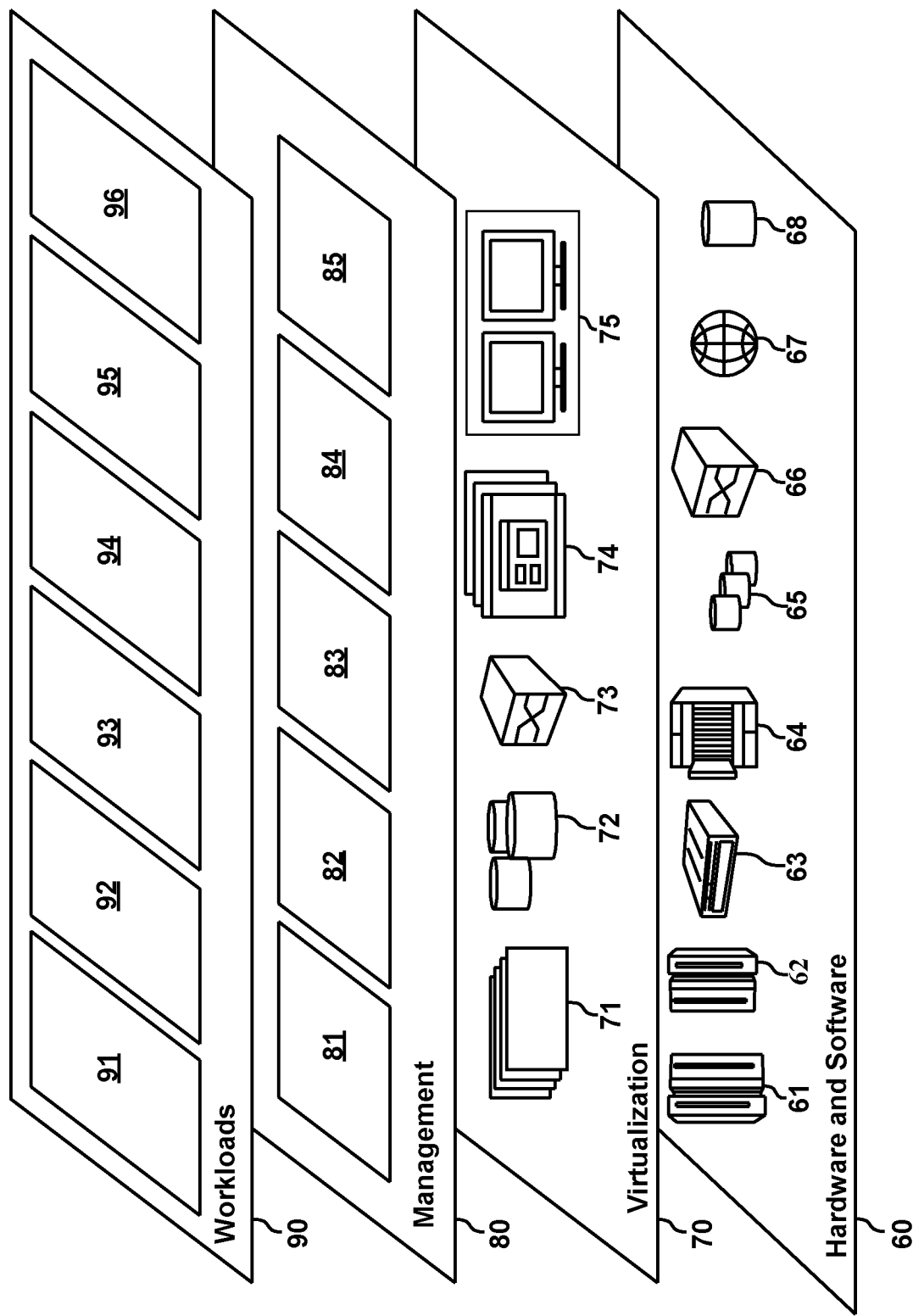
FIG. 8 is a functional block diagram depicting abstraction model layers, in accordance with an embodiment of the present invention.

FIG. 8 is a block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speech recognition transcription correction 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for training a model for improving speech recognition, the computer-implemented method comprising:

receiving, by one or more processors, a history of utterances and corresponding audio metrics for the utterances;

identifying, by the one or more processors, one or more high frequency terms based on the history of utterances;

converting the identified one or more high frequency terms into one or more phonemes;

generating, by the one or more processors, a sounds similar list for the identified one or more high frequency terms, based at least in part, on the one or more phonemes;

transcribing, by the one or more processors, an utterance from a virtual assistant into a transcription including one or more words, wherein transcribing comprises instructions to transform the utterance from a virtual assistant into an audio spectrogram and identifying one or more phonemes of the utterance from the virtual assistant based, at least in part, on the audio spectrogram;

calculating, by the one or more processors, a transcription score for each of the more or more words included in the transcription; and responsive to the transcription score for a word from the transcription being below a threshold, comparing, by the one or more processors, one or more phonemes of the word having the transcription score below the threshold to the one or more phonemes of the high frequency terms on the sounds similar list to determine a sounds similar score and replacing the word included in the transcription having the transcription score below the threshold with a high frequency term on the sounds similar list if the sounds similar score is above a threshold.

2. The computer-implemented method of claim 1, wherein the audio metrics identify the frequency of an utterance and the frequency of one or more terms corresponding to the utterance.

3. The computer-implemented method of claim 1, wherein transcribing the utterance from the virtual assistant into the transcription including the one or more words is performed by a speech recognition model based on a deep neural network.

4. The computer-implemented method of claim 1, further comprising:
assigning, by the one or more processors, a sounds similar value to the term phonemes which corresponds to the utterance phonemes.

5. The computer-implemented method of claim 1, wherein the history of utterances is from a virtual assistant.

6. A computer system for improving speech recognition transcriptions, the system comprising:
one or more computer processors;
one or more computer readable storage media device;
computer program instructions stored on the computer readable storage device, comprising instructions to:
receive a history of utterances and corresponding audio metrics for the utterances;
identify one or more high frequency terms based on the history of utterances;
convert the identified one or more high frequency terms into one or more phonemes;
generate a sounds similar list for the identified one or more high frequency terms, based at least in part, on the one or more phonemes;
transcribe an utterance from a virtual assistant into a transcription including one or more words, wherein transcribe comprises instructions to transform the utterance from a virtual assistant into an audio spectrogram and identify one or more phonemes of the utterance from the virtual assistant based, at least in part, on the audio spectrogram;
calculate a transcription score for each of the one or more words included in the transcription; and
responsive to the transcription score for a word from the transcription being below a threshold, compare one or more phonemes of the word having the transcription score below the threshold to the one or more phonemes of the high frequency terms on the sounds similar list to determine a sounds similar score and replacing the word included in the transcription having the transcription score below the threshold with a high frequency term on the sounds similar list if the sounds similar score is above a threshold.

7. The computer system of claim 6, wherein the audio metrics identify the frequency of an utterance and the frequency of one or more terms corresponding to the utterance.

8. The computer system of claim 7, wherein transcribing the utterance from the virtual assistant into the transcription including the one or more words is performed by a speech recognition model based on a deep neural network.

9. The computer system of claim 6, further comprising instructions to:
assign a sounds similar value to the term phonemes which corresponds to the utterance phonemes.

10. The computer system of claim 6, wherein the history of utterances is from a virtual assistant.

11. A computer program product for improving speech recognition transcriptions, the computer program product comprising a computer readable storage media device and program instructions sorted on the computer readable storage media device, the program instructions including instructions to:
receive a history of utterances and corresponding audio metrics for the utterances;
identify one or more high frequency terms based on the history of utterances;
convert the identified one or more high frequency terms into one or more phonemes;
generate a sounds similar list for the identified one or more high frequency terms, based at least in part, on the one or more phonemes;
transcribe an utterance from a virtual assistant into a transcription including one or more words, wherein transcribe comprises instructions to transform the utterance from a virtual assistant into an audio spectrogram and identify one or more phonemes of the utterance from the virtual assistant based, at least in part, on the audio spectrogram;
calculate a transcription score for each of the one or more words included in the transcription; and
responsive to the transcription score for a word from the transcription being below a threshold, compare one or more phonemes of the word having the transcription score below the threshold to the one or more phonemes of the high frequency terms on the sounds similar list to determine a sounds similar score and replacing the word included in the transcription having the transcription score below the threshold with a high frequency term on the sounds similar list if the sounds similar score is above a threshold.

12. The computer program product of claim 11, wherein the audio metrics identify the frequency of an utterance and the frequency of one or more terms corresponding to the utterance.

13. The computer program product of claim 12, wherein transcribing the utterance from the virtual assistant into the transcription including the one or more words is performed by a speech recognition model based on a deep neural network.

14. The computer program product of claim 11, further comprising instructions to:
assign a sounds similar value to the term phonemes which corresponds to the utterance phonemes.

15. The computer program product of claim 11, wherein the history of utterances is from a virtual assistant.

* * * * *